UNITED STATES PATENT OFFICE.

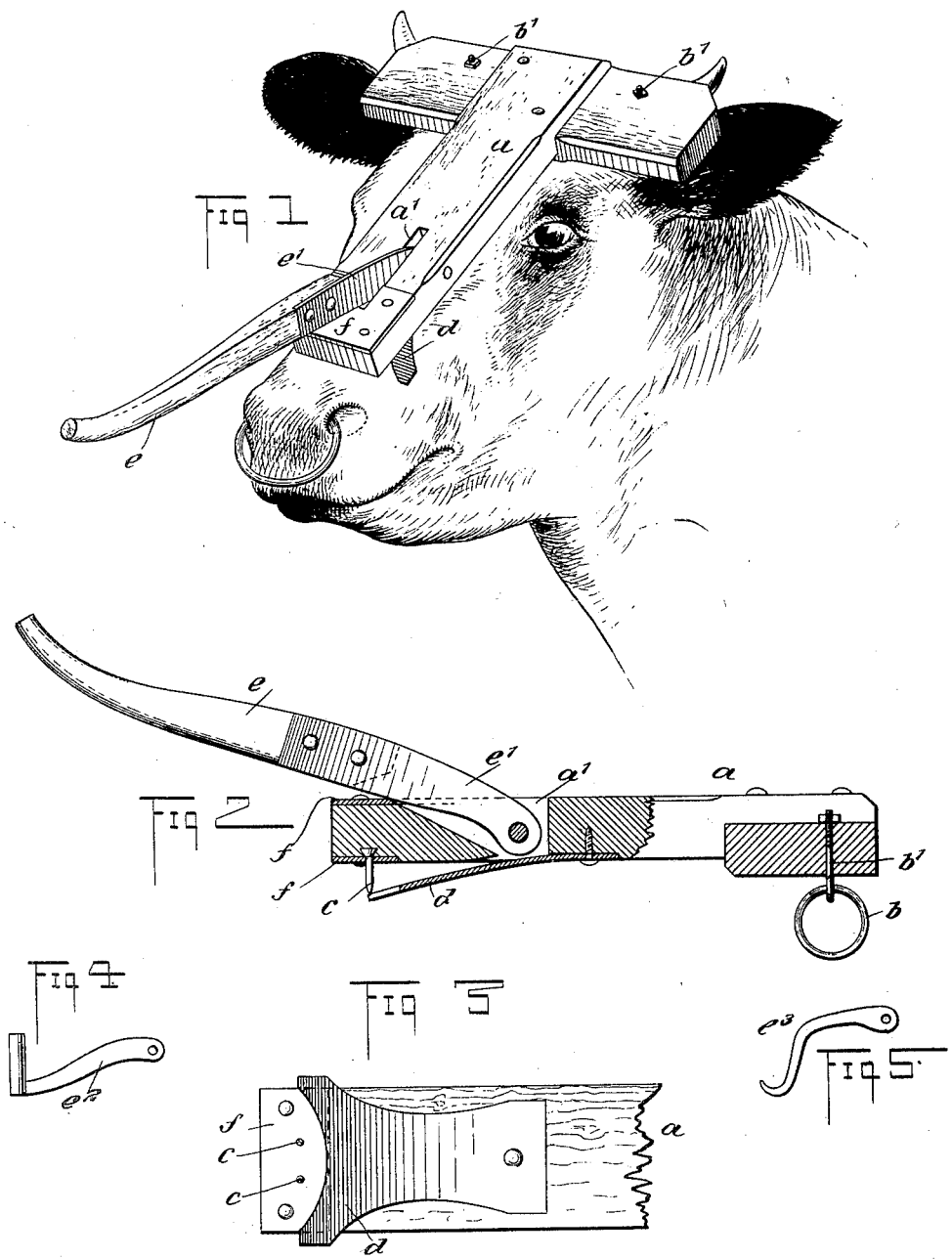

WILHELM SPECHT AND DIETRICH TIEKEN, OF NEAR CLEAR SPRINGS, TEXAS.

ANIMAL-POKE.

SPECIFICATION forming part of Letters Patent No. 667,959, dated February 12, 1901.

Application filed August 3, 1900. Serial No. 25,766. (No model.)

*To all whom it may concern:*

Be it known that we, WILHELM SPECHT and DIETRICH TIEKEN, citizens of the United States, and residing near Clear Springs, in the county of Guadalupe and State of Texas, have invented a new and Improved Animal-Poke, of which the following is a full, clear, and exact description.

The purpose of this invention is to provide means for preventing animals, especially cows, from tearing down and otherwise destroying fences, to which end the invention resides in certain arrangements of parts which cause the animal to be pierced by a pin or pins the instant that pressure is applied to a fence.

This specification is the disclosure of one form of our invention, while the claim defines the actual scope thereof.

Reference is to be had to the accompanying drawings, forming a part of this specification, in which similar characters of reference indicate corresponding parts in all the views.

Figure 1 is a perspective view of the invention in use. Fig. 2 is a longitudinal section of the invention. Fig. 3 is a fragmentary bottom plan view showing the devices for piercing or sticking the animal, and Figs. 4 and 5 are side elevations of modified forms of the poke-arm hereinafter more particularly described.

The animal-poke comprises a body part $a$ in the form of a T, the head or cross piece of which is provided with two rings $b$, fastened by bolts $b'$, the rings $b$ serving to receive the horns of the animal, whereby to hold the body $a$ of the device in operative position, as shown in Fig. 1. To the under side of the front or lower portion of the body $a$ of the device two pins $c$ are fastened, the pins projecting downwardly in position to pierce the head of the animal. A spring-plate $d$, forming a protector, is fastened to the under side of the body $a$ of the device and has its free end extended forward, the free end of the protector normally lying beyond the end of the pins $c$, so as to hold the points of the pins out of contact with the animal's head. When, however, the front portion of the body of the poke is pressed downward, the spring-protector $d$ is overcome and the pins $c$ are caused to pierce the animal, thus subjecting the same to pain and arresting the movement of the animal. A poke-arm $e$ is pivotally mounted on the body $a$ and normally extends forwardly and downwardly, so that when the animal attempts to project its nose under a fence or gate to lift the same the arm $e$ engages the fence and communicates pressure to the body $a$ of the device, throwing the front end thereof downward and causing the pins $c$ to pierce the head of the animal. This arm $e$ has an extension-plate $e'$ fastened thereto, such plate projecting into a slot $a'$ in the body $a$ of the device, so that the arm $e$ may be thrown inward when the animal is eating without in any way causing the animal to be annoyed by the pins $c$. The front end of the body $a$ of the device may, if desired, be bound by plates $f$, which are fastened to the top and bottom thereof, as shown.

Figs. 4 and 5 show, on a reduced scale, two modifications of the poke-arm $e$. In Fig. 4 the arm $e^2$ is shown with an abruptly-upturned end which adapts it to animals whose tendency is to pass under fences, and Fig. 5 shows an arm $e^3$ with an abruptly-downturned end and having an upwardly-curved terminal and which adapts it to animals whose tendency is to jump over fences.

Having thus described our invention, we claim as new and desire to secure by Letters Patent—

An animal-poke having a body part with a poking device at the front end, means at the rear end for sustaining the body part on the front of the animal's head with the front end of the body part free, a pin carried on the under side of the body near the front thereof, and a yielding protector arranged under the body at the pin, and normally holding the pin out of engagement with the animal's head.

In testimony whereof we have signed our names to this specification in the presence of two subscribing witnesses.

WILHELM SPECHT.
DIETRICH TIEKEN.

Witnesses:
F. C. W. EINERT,
CHAS. H. DONEGAN.